US008615555B2

(12) United States Patent
Koch

(10) Patent No.: US 8,615,555 B2
(45) Date of Patent: *Dec. 24, 2013

(54) REMOTE ACCESS AND RETRIEVAL OF ELECTRONIC FILES

(75) Inventor: Robert A. Koch, Norcross, GA (US)

(73) Assignee: Wantage Technologies LLC, Wilmington, DE (US)

(*) Notice: Subject to any disclaimer, the term of this patent is extended or adjusted under 35 U.S.C. 154(b) by 368 days.

This patent is subject to a terminal disclaimer.

(21) Appl. No.: 12/169,074

(22) Filed: Jul. 8, 2008

(65) Prior Publication Data
US 2008/0288586 A1 Nov. 20, 2008

Related U.S. Application Data

(63) Continuation of application No. 11/690,803, filed on Mar. 23, 2007, now Pat. No. 7,398,298, which is a continuation of application No. 10/109,914, filed on Mar. 29, 2002, now Pat. No. 7,197,537.

(51) Int. Cl.
G06F 15/16 (2006.01)

(52) U.S. Cl.
USPC ............................ 709/206; 709/223; 709/224

(58) Field of Classification Search
USPC .................. 709/206, 219; 707/205, E17.005, 707/E17.032
See application file for complete search history.

(56) References Cited

U.S. PATENT DOCUMENTS

| 5,742,905 | A | 4/1998 | Pepe et al. |
| 5,809,415 | A | 9/1998 | Rossmann |
| 5,870,454 | A | 2/1999 | Dahlen |
| 5,970,063 | A | 10/1999 | Chapman et al. |
| 6,138,158 | A | 10/2000 | Boyle et al. |
| 6,148,405 | A | 11/2000 | Liao et al. |
| 6,237,093 | B1 | 5/2001 | Vatanen |
| 6,240,445 | B1 | 5/2001 | Kumar et al. |
| 6,332,164 | B1 | 12/2001 | Jain |
| 6,473,609 | B1 | 10/2002 | Schwartz et al. |
| 6,732,101 | B1 | 5/2004 | Cook |
| 7,577,092 | B2 * | 8/2009 | San Andres et al. .......... 370/230 |
| 2001/0047427 | A1 | 11/2001 | Lansio et al. |
| 2001/0049636 | A1 | 12/2001 | Hudda et al. |
| 2001/0052052 | A1 | 12/2001 | Peng |
| 2002/0002590 | A1 | 1/2002 | King et al. |

(Continued)

FOREIGN PATENT DOCUMENTS

WO WO-0213551 A1 2/2002

OTHER PUBLICATIONS

Boyd, Gerald E. "Accessing the Internet by Email FAQ", Version 9.3, Aug. 1, 2000, 15 pages.*

(Continued)

Primary Examiner — Lashonda Jacobs
(74) Attorney, Agent, or Firm — Novak Druce Connolly Bove + Quigg LLP

(57) ABSTRACT

A system and methods for remotely accessing, retrieving, and transmitting data offering remote data management control and verification of data delivery is provided. In an illustrative implementation, the present invention comprises a computing application operating on at least one computer server that cooperates with at least one communications network to which participating users have access. The exemplary computing application coordinates the delivery of desired data its corresponding data directory structure information to participating users over the communications network. The methodology may provide notification of delivery of data to intended targets using the communications network.

12 Claims, 13 Drawing Sheets

(56) References Cited

U.S. PATENT DOCUMENTS

| | | |
|---|---|---|
| 2002/0024536 A1 | 2/2002 | Kahan et al. |
| 2002/0032601 A1 | 3/2002 | Admasu et al. |
| 2002/0046353 A1 | 4/2002 | Kishimoto |
| 2002/0075521 A1 | 6/2002 | Oobayashi |
| 2002/0128954 A1 | 9/2002 | Evans |
| 2002/0164983 A1 | 11/2002 | Raviv et al. |
| 2002/0174180 A1 | 11/2002 | Brown et al. |
| 2002/0188736 A1 | 12/2002 | Jarvensivu |
| 2002/0198944 A1* | 12/2002 | Moss .................. 709/206 |
| 2003/0002635 A1 | 1/2003 | Koch et al. |
| 2003/0020750 A1 | 1/2003 | Brown et al. |
| 2003/0045275 A1 | 3/2003 | McDonagh et al. |
| 2003/0046421 A1 | 3/2003 | Horvitz et al. |
| 2003/0050041 A1 | 3/2003 | Wu |
| 2003/0050906 A1 | 3/2003 | Clifton-Bligh |
| 2003/0064716 A1 | 4/2003 | Gailey et al. |
| 2003/0065620 A1 | 4/2003 | Gailey et al. |
| 2003/0065749 A1 | 4/2003 | Gailey et al. |
| 2003/0084049 A1* | 5/2003 | Wiley .................. 707/10 |
| 2003/0088436 A1 | 5/2003 | Berger et al. |
| 2003/0097358 A1 | 5/2003 | Mendez |
| 2003/0104827 A1 | 6/2003 | Moran et al. |
| 2003/0115226 A1 | 6/2003 | Gopalan |
| 2003/0117316 A1 | 6/2003 | Tischer |
| 2003/0164862 A1 | 9/2003 | Cadiz et al. |
| 2004/0010558 A1 | 1/2004 | Saito et al. |
| 2004/0078274 A1 | 4/2004 | Aarnio |
| 2004/0174559 A1 | 9/2004 | Mori |

OTHER PUBLICATIONS

Yahoo!, Inc. "Yahoo! Briefcase Help", downloaded from archive.org, 2001, 5 pages.*

Postel, J. and Reynolds, J. "Request for Comments (RFC) 959: File Transfer Protocol (FTP)", published by Network Working Group, Oct. 1985, 69 pages.*

Moore, K. "Request for Comments (RFC) 1891: SMTP Service Extension for Delivery Status Notifications", published by Network Working Group, Jan. 1996, 31 pages.*

Horowitz, M. and Lunt, S. "Request for Comments (RFC) 2228: FTP Security Extensions", published by Network Working Group, Oct. 1997, 27 pages.*

* cited by examiner

REMOTE ACCESS AND RETRIEVAL OF ELECTRONIC FILES

RELATED CASES

This application is a continuation of U.S. patent application Ser. No. 11/690,803, filed on Mar. 23, 2007 and entitled REMOTE ACCESS AND RETRIEVAL OF ELECTRONIC FILES, which is a continuation of U.S. patent application Ser. No. 10/109,914 (now issued as U.S. Pat. No. 7,197,537). U.S. patent application Ser. No. 11/690,803 is herein incorporated by reference in its entirety.

FIELD OF THE INVENTION

The present invention relates to the field of data retrieval, and more particularly, to the retrieval and transmission of data from and/or to a remote server using computing elements varying in form-factor and complexity.

BACKGROUND

Advances in communications technologies have had a significant impact on our lives. From simple telephony to video conferencing, communication technologies have allowed us to more easily transfer data from one source to another regardless of geographic limitations. The Internet hails as the one of the most recent significant advances that has had a substantial influence on our daily routines. Evidence of this impact can be seen in the insatiable appetites for e-mail communications and Internet services, such as, the World Wide Web (WWW), instant messaging, online discussion boards (chat rooms), etc. The impact of the Internet and other similar communications networks can be seen both at home and in the workplace. Public and private sectors, alike, have recognized the strength of these communication technologies and have deployed comprehensive information technology plans to exploit them. These information technology plans allow employees to engage in telecommuting such that data resources may be leveraged, in real time, to employees independent of geographic limitation. As a result, both the enterprise and its employees realize significant benefits from this ability.

The communication industry has been quick to respond to the growing needs of consumers to have access to data. A slew of products and services have been designed developed, and deployed in response to these needs. From broadband data services to wireless telephony, communication technology developers and service providers (e.g. telecommunication companies such as regional Bells) have deployed and continue to deploy communications products and services that operate on their communications networks. When deployed, these services allow for the real-time data transmission and delivery. For example, communication service providers support the mobile delivery and transmission of electronic mail to hand-held mobile computing devices such that participating users can access their electronic mail remotely. Similarly, real-time browsing of Internet Web content, delivery of secure corporate data is also supported by current communications networks. As such, communications service providers are constantly striving to exploit the capacity and abilities of their communications networks.

Current communications network services focus on the delivery and storage of content. Typically, data is stored on a computer server connected to one or more communications networks supported and maintained by the communications network service providers. The computer server executes one or more computing applications that allow participating users to access a variety of data stored either on the computer server or on one or more cooperating data stores. Generally, with current communications network services, participating users have little to no control over where the data may be stored. That is, the computer server computing applications perform most of the data management functions and for the most part act to "push" the data from the computer server to the participating users' computing device (e.g. home personal computer, mobile telephone, mobile personal digital assistant, etc.). Furthermore, current remote access systems and methods do provide confirmation to participating users of the delivery and distribution of desired data. That is, participating users most often are left to assume that the communications network with which they are interacting has delivered the desired data in accordance with the participating users' intentions.

However, these practices fall short of providing participating users with the ability to remotely access data such that the participating users have data management and storage control (e.g. control over the directory structure), as well as, receive confirmation that desired data has been delivered and/or distributed correctly. Without the ability to remotely have data management control and without confirmation of proper data delivery, participating users are often left with the arduous tasks of ferreting out desired data from pre-defined directory structures and manually confirming that desired data has been delivered to intended parties. Moreover, in the context of remotely accessing data from a corporate network, often participating users require the ability to create new directory data structures to store new data, modified data, or simply to move data from one storage location to another. Current communications networks systems do not support such capabilities leaving participating users wanting.

From the forgoing it is appreciated that there exists a need for comprehensive system and methods that allow the remote access and transmission of data such that users have remote control data storage management features (e.g. control over directory structures).

SUMMARY

System and methods are disclosed that allow the remote access of data over a communications network such that participating users have the ability to control data directory structures where data is stored and that provides notification of data delivery to the sending party upon delivery of data to the desired target. In an illustrative implementation, the remote data access system comprises a computer server operating at least one computing application that allows for the transmission and delivery of data across the communications network. The illustrative computer server operates a computing application that manages the transmission and delivery of desired data, data structures, and data delivery notifications to remote computing devices over the communications network.

In operation, participating users may send requests to view and manipulate data and associated data directory structures over the communications network (or communications networks) to a computing application operating on one or more cooperating computing servers. The computing application coordinates the retrieval and aggregation of data from various cooperating data stores and computer servers to authenticate participating users trying to gain access to stored data and data directories and to provide desired data and data directory information. Furthermore, the computing application coordinates the delivery of data over one or more communication networks to desired targets identified by participating users and provides notification to participating users of data delivery.

Other features of the present invention are described below.

BRIEF DESCRIPTION OF THE DRAWINGS

The system and methods for remote retrieval of data are further described with reference to the accompanying drawings in which.

DETAILED DESCRIPTION OF ILLUSTRATIVE IMPLEMENTATION

Overview

Figure 1:
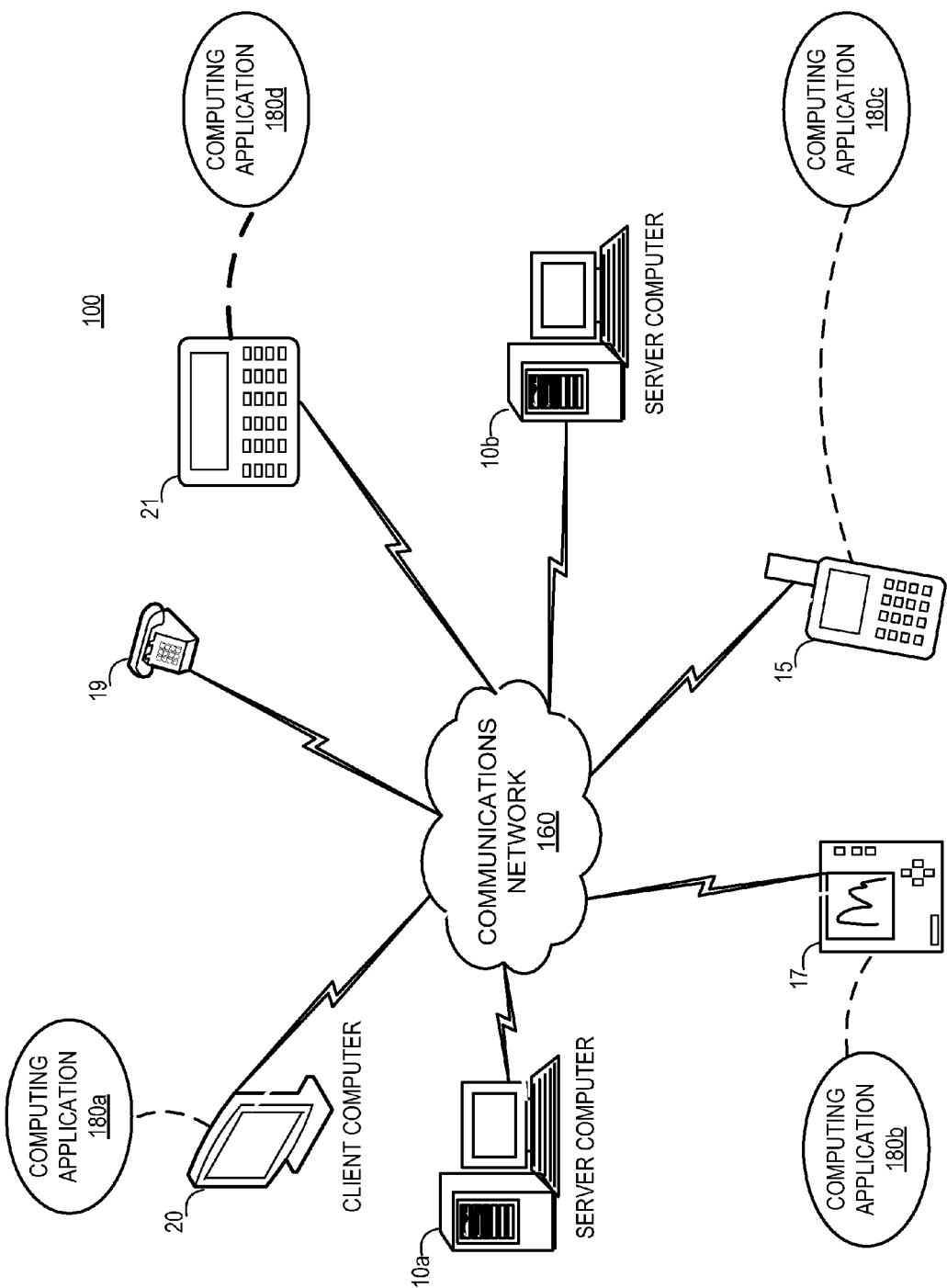
FIG. 1 is a system diagram of a an exemplary networked computing environment.

The adage "knowledge rules" still reigns supreme. In the era of information technology ("IT") and communications networks, consumers (and/or users) have put a premium on the ability to have real-time access to their data (or conversely their source of knowledge) regardless of geography and time of day. In response, communications service providers have designed, developed, and deployed various services that allow participating users to have access to their desired data. Such services include mobile telephony, mobile e-mail, and wireless access to the World Wide Web. These services, for the most part, allow participating users to access data without control over the underlying data directory structure in which the data may be stored. Stated differently, with existing communications services deployed on existing communications networks, participating users are able to view, modify, and store data but are not able to view or modify the underlying data directory structure in which the data is stored.

The consequences of having a lack of directory control is most felt by participating corporate users. Specifically, in the corporate communications environment, corporate users often are required to access data remotely. Whether the corporate user relies on a virtual private network (VPN), a local-area network (LAN), a wide-area network (WAN), or other communications network(s) to access their data, the corporate user most often seeks to not only control the desired data but also its corresponding data directory structure. For example, a sales person is on a client call and realizes that he/she forgot the client's profile report in the office. Under current practices, the salesperson will most likely have to cell someone at the office to pull the client's profile report from their network and possibly e-mail the report to the salesperson for viewing on his/her portable (mobile) computing device. Such practice, as one may imagine, is rather arduous and time consuming. Further, the salesperson would have to rely on another person to "pull" the desired data. It is noted that there may exist practices that allow participating users control over data and data directory structure remotely. However, such practices are generally not operable over wireless communications networks thereby requiring participating users to use non-wireless computing devices to access and control data and its corresponding data directory structure. A more palatable scenario envisions the salesperson having direct access to the data and its corresponding directory structure through their mobile device.

Systems and methods disclosed herein aim to ameliorate the shortcomings of existing practices offering participating users the ability to access data remotely wherein such access includes the ability to control data directory structures maintaining desired data. Further, the disclosed system provides notifying participating users delivery of data over the communications networks to desired targets. In an illustrative implementation, a system comprises a computing application operating on at least one computer server that cooperates with at least one communications network to which participating users have access. The computing application coordinates the delivery of data and data structure information to participating users over the communications network. Other aspects of the illustrative systems and methods are described below.

Illustrative Communications Network Environment

FIG. 1 illustrates an exemplary network environment 100, with a server computer 10a, 10b in communication with a number of communication devices (or computing devices) via a communications network 160, in which the exemplary system and methods may be employed. As shown in FIG. 1, a number of servers 10a, 10b, etc., are interconnected via a communications network 160 (which may be either a fixed wire or wireless LAN, WAN, intranet, extranet, peer-to-peer network, or the Internet) with a client computer 20, or computing devices, such as, mobile phone 15, personal digital assistant 17, telephone 19, and pager 21. In a network environment in which the communications network 160 is the Internet, for example, servers 10a and 10b can be Web servers with which the communication and/or computing devices communicate via any of a number of known protocols, such as, hypertext transfer protocol (HTTP) or wireless application protocol (WAP), as well as other innovative communication protocols. Each computing device can be equipped with computing application 180a, 180b, 180c, and 180d, for example, to gain access to the servers 10.

Thus, an exemplary computer network environment having client computing devices for accessing and interacting with the network and a server computer for interacting with client computers has been disclosed. However, the systems and methods for providing remote access of data of embodiments of the present invention can be implemented with a variety of network-based architectures, and is not limited to the example shown.

Remote Data Retrieval and Transmission

Figure 2:
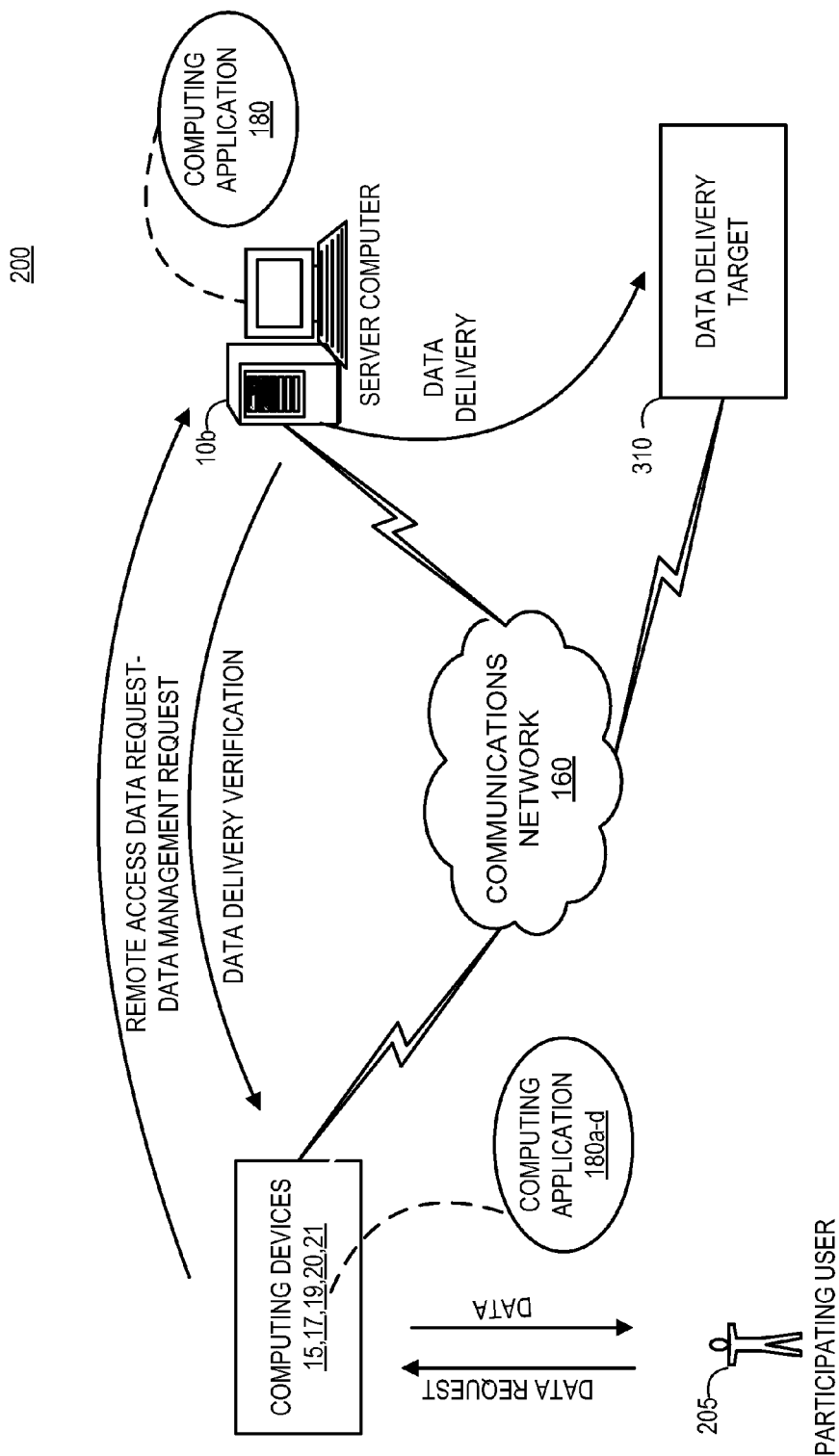
FIG. 2 is a block diagram showing the interaction between exemplary parties when retrieving and transmitting data.

FIG. 2 depicts the interaction between client computing devices and server computers to realize remote access and management of data. As shown in remote access system 200, a participating user 205 may request data from a remote server computer by interacting with one or more computing devices 15, 17, 19, 20, and 21 (of FIG. 1) operating computing applications 180a-d. Computing applications 180a-d communicate the request to the server computer 20b operating computing application 180a over communications network 160. The request is processed by computing application 180a, as described below, to execute the request for data delivery. Once processed, the data is delivered to a data delivery target 310, which may be, for example, another user of the requestor himself, over communications network 160. A data delivery verification is delivered to the requesting computing device as indicated by the arrows. The participating user 205 is then allowed to view the data and/or data delivery verification notice using computing devices 15, 17, 19, 20, and 21.

Figure 3:
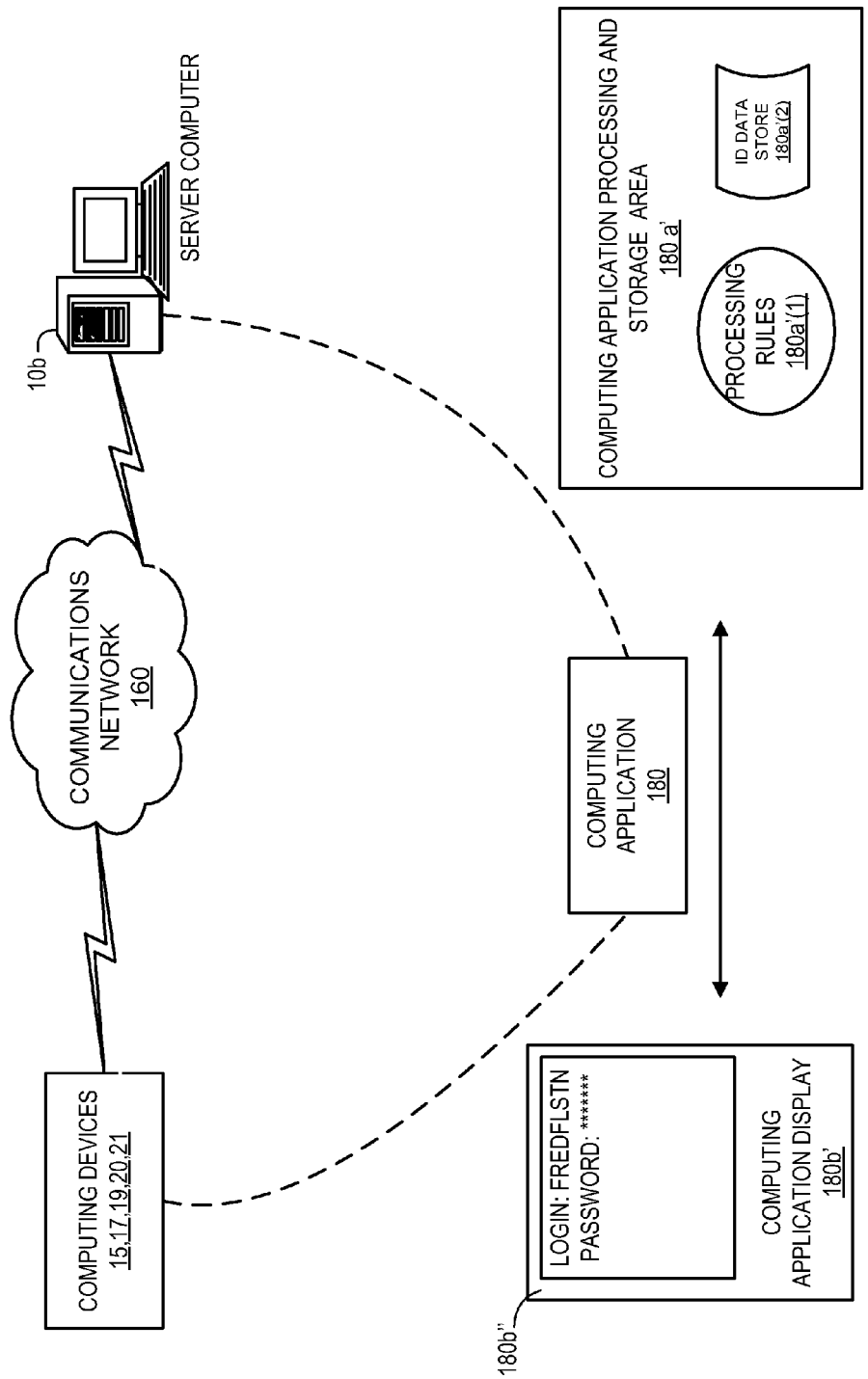
FIG. 3 is a block diagram of an exemplary computing application operating to retrieve and transmit data remotely.

FIG. 3 illustrates the operation of exemplary computing application 180 that operates on remote data access and management system 200 that operates to allow remote access and management of data. As shown computing application 180 comprises a computing application processing and storage area 180a' and a computing application display area 180b'. Computing application processing and storage area 180a' further comprises processing rules 180a'(1) and ID data store 180a'(2). Computing application display area 180b' comprises display content 180b". In operation, data may be processed in computing application processing and storage area 180a' for display in computing application display area 180b'. In an illustrative implementation, when a request is made to retrieve and/or manage data from remote access and management system, the request for data is passed to computing application 180. The request is first processed according to processing rules 180a'(1) and using ID data store 180a'(2) to authenticate the request. If authenticated, the request is honored and the desired data is placed for display as display content 180b' in computing application display area 180b'.

FIGS. 4-7 show an exemplary deployment of a remote data access system that allows for the remote access of data and its corresponding data directory structure, as well as that performs data delivery notification. As shown, remote data access system 400 comprises various communication devices including but not limited to mobile telephone 402, telephone 408, pager 410, wireless access protocol (WAP) device 402a, wireless personal digital assistant (PDA) 412, pocket-PC 414, and client computer 422. These communication devices (or computing devices) maintain a number of communications network connections allowing them to transmit and receive various data between themselves and cooperating communications networks and other communications devices (or computing devices). For example and as shown in FIGS. 4-7, mobile telephone 402 communicates data to wireless voice provider communications network 404. In turn, wireless voice provider communications network may cooperate with a central office (CO) 406 of a telephone communication network. The CO, providing connections to telephones 408, in turn may cooperate with a voice XML server 416 that itself is connected to the Internet 444. Further, voice XML server 416 may also cooperate with public switch telephone network (PSTN) or other wireless carrier.

Similarly, pager 410, WAP device 402a, wireless PDA 412, and pocket-PC 414 may be connected to wireless data provider 448. Specifically, WAP device 402a may connect to wireless data provider 448 through WAP gateway server 438, and wireless PDA 412 may connect to wireless data provider 448 through web access gateway 440. The wireless data provider communications network 448 may cooperate with the Internet 444 so that communication devices 410, 402a, 412, and 414 may transmit and receive data over the Internet 444.

Lastly, the Internet may cooperate with a number of computer servers including remote e-mail server 420 and web server 428. As shown, web server 428 cooperates with the Internet through firewall 426 and maintains communication with e-mail server 424. Furthermore, web server 428 hosts a remote access application 425 that coordinates the remote access of data and the delivery and notification of accessed data. Remote access application 425 cooperates with a number of data stores to realize remote access and delivery notification of data. These data stores may include a user authentication data store 424, a profile data store 432 and data files data store 430. User authentication data store 424 contains data representative of user information (e.g. usernames and passwords). Comparatively, profile data store 432 may contain information indicative of user profiles that give insight to the scope of data a particular user be allowed to access. Data files data store 430 contains the desired data and corresponding data directory structures.

Generally, in order to gain access to data remotely using the preset system, the user must identify themselves to the system. Typically, this is accomplished by requiring users to enter a user identification and password combination. Thus, when a user using a device such as, for example, PDA 412 desired to access their data, they must enter a USER ID and PASSWORD as described below in connection with FIG. 8. Upon entering this information, it is transmitted through system 400 to access remote access application 425 where user authentication processing is performed.

Figure 4:
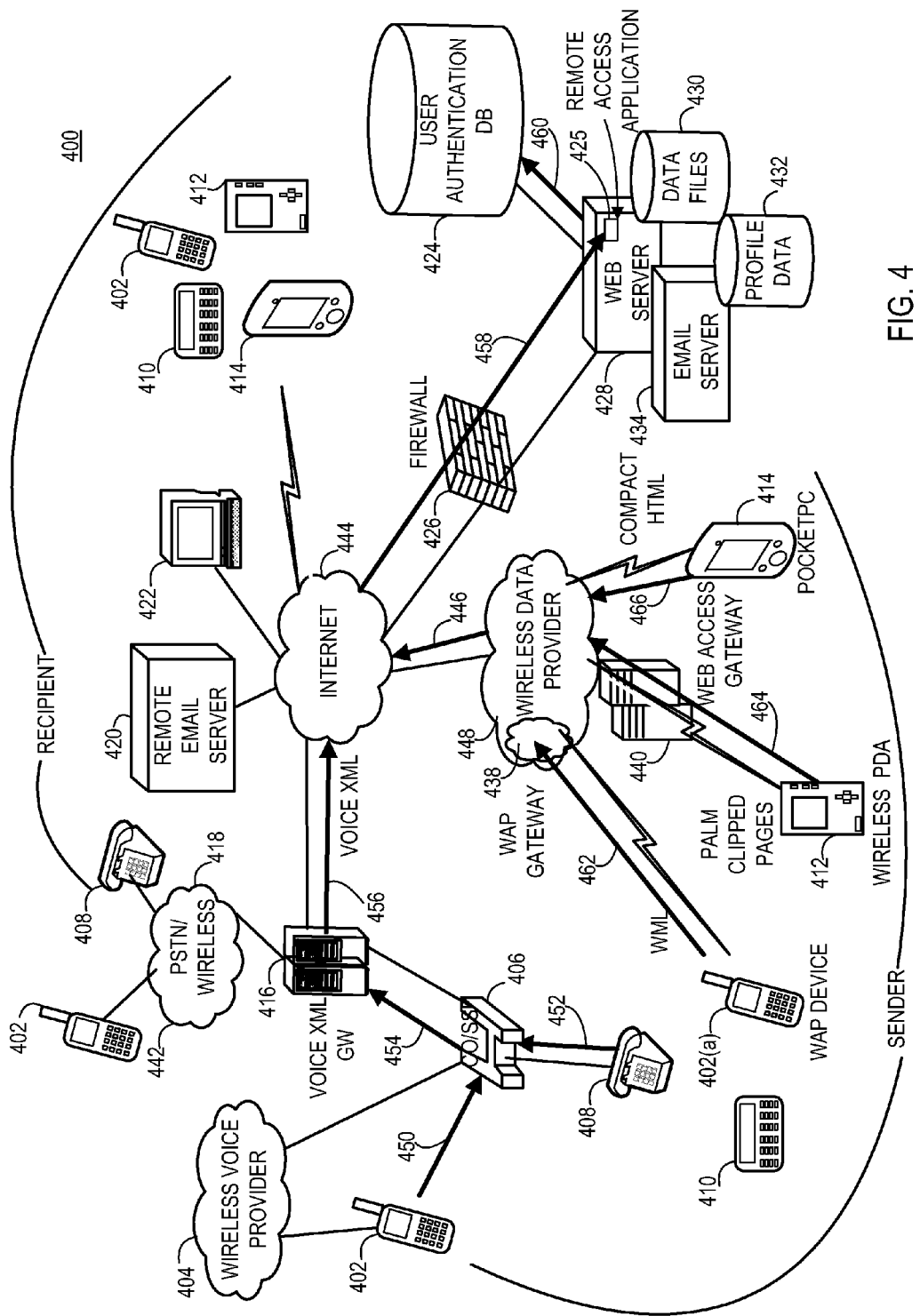
FIG. 4 is a block diagram showing the interaction between exemplary components of a remote data retrieval system when logging onto the communications network.

FIG. 4 shows the data flow (as indicated by the arrows) of data communicated 4 through remote data access system 400 when performing user authentication. As shown user authentication data may originate from a number of different sources (e.g. mobile telephone 402, telephone 408, pager 410, wireless access protocol (WAP) device 402a, wireless personal digital assistant (PDA) 412, and pocket-PC 414). The authentication request comprises a user identification and password of some sort. The authentication request is passed along to the various cooperating communications networks as shown by arrows 450, 452, 462, 464, 466. In turn, these communications networks pass along the authentication request to the Internet as indicated by arrows 456 and 446. The request is then passed along to the cooperating web server 428 as indicated by arrow 458 where it is processed by remote access application 425 operating on web server 428. In turn, remote access application 425 calls upon user authentication database 424 to retrieve authentication information for use in processing the authentication request. Specifically, user authentication data store 424 receives a password associated with a user ID in the authentication request. If the password in the request matches that received from data store 424, access to data files data store 430 is granted. Of course, if the password in the request does not match, then authentication fails and notification of the failure is transmitted through remote data access system 400 to the device from which the authentication request originated.

Conversely, if the authentication process indicates data access should be provided, remote access application 425 queries profile data store 432 to determine what data and directories are to be made available to the requesting device (e.g. participating user requesting access). The results of this query, which may identify the directories and files accessible to the requesting device, are forwarded by remote access application 425 via remote data access system 400 to the device from which the request was made. At the requesting device, the accessible directories and files are displayed by exemplary computing application 180*a-d* (not shown) using an interface, such as, for example is described in connection with FIGS. 9-10.

Figure 5:
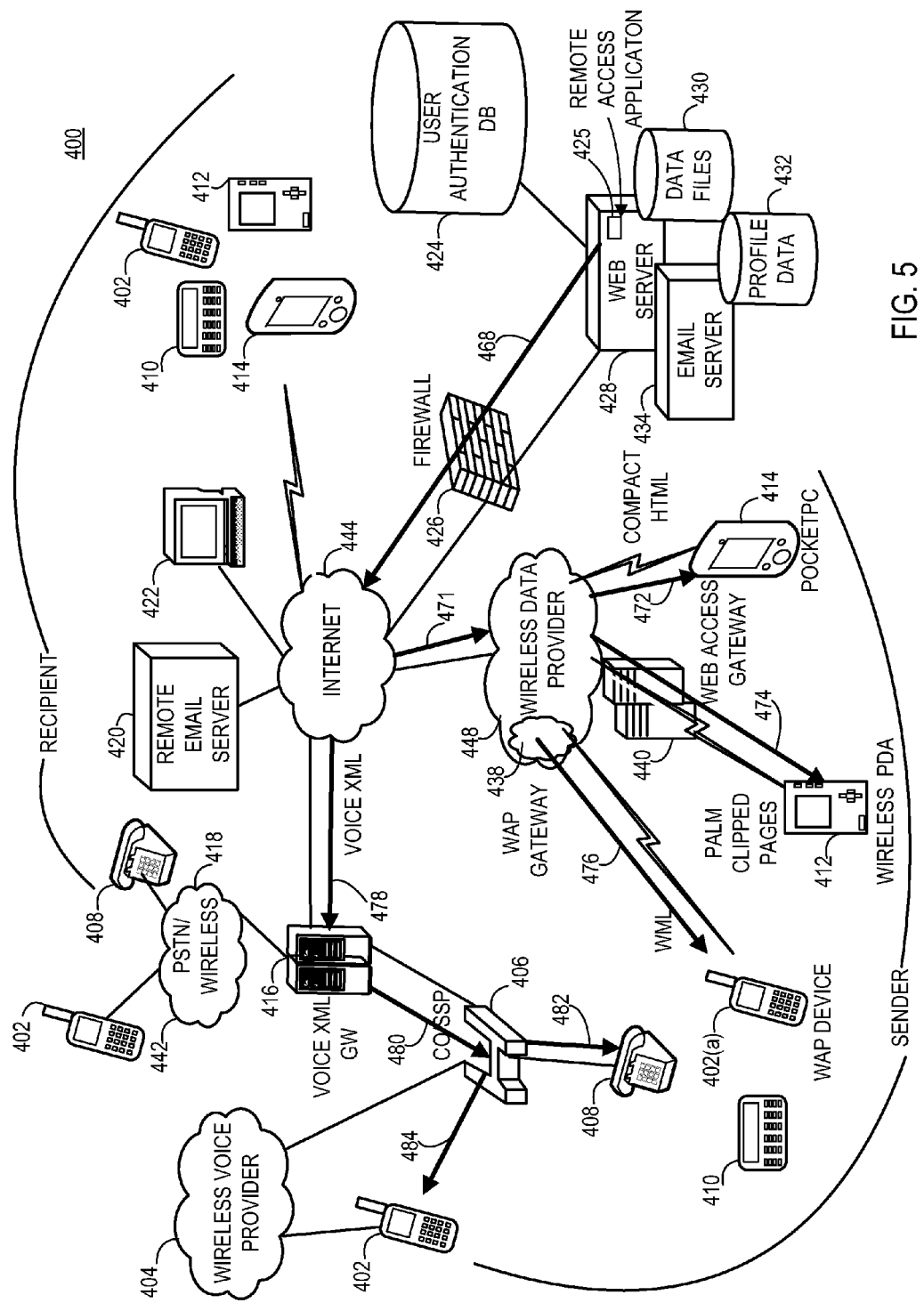
FIG. 5 a block diagram of showing the interaction between exemplary components of a remote data retrieval system when viewing data.

FIG. 5 shows the data flow (as indicated by the arrows) of data communicated through remote data access system 400 when performing data and data directory structure retrieval for display and manipulation of the cooperating communication devices. As shown, the remote access application cooperates with data files data store 430 to retrieve desired data (as indicated by a request for data by a participating user (communication device)—not shown) as indicated by arrow 470. The data is formatted by remote access application and communicated to the requesting communications device through the Internet 444 by web server 428. The data may travel across a number of cooperating communications networks from the Internet 444 to reach the requesting communications devices. For example, if the requesting device is mobile telephone 402, data would travel across the Internet 444 to voice XML server 416 as indicated by arrow 478 to CO 406 as indicated by arrow 480 and then to the mobile telephone 402 through wireless voice provider communications network 404 as indicated by arrow 484. Comparatively, arrow 482 indicates the data path if telephone 408 were the requesting communications device and arrows 471 and 476, 474, and 472 indicate the data path if any of pager 410, WAP device 402(*a*), wireless PDA 412, and pocket-PC 414 were the requesting communication devices. Once at the requesting communications device, the desired data and its corresponding data directory structures may be displayed, and furthermore instructions may be sent along the various data paths to indicate modifications and storage of the desired data and corresponding data directory structures. These instructions are processed and executed by the remote access application operating on web server 428.

After receiving an indication of the directories and data accessible to them, participating users may choose to perform a number of procedures, including, forwarding a file or files stored in data files data store 420 to another user, downloading a file to the requesting participating users' computing device (e.g. mobile phone 402, telephone 408, pager 410, PDA 412, pocket-PC 414, client PC 422), or manipulating the remotely stored data directories and/or files. Requests for performing these or any other type of data access function/operation are formatted by the participating users' requesting devices, forwarded over remote data access system 400, and processed by remote access application 425.

Figure 6:
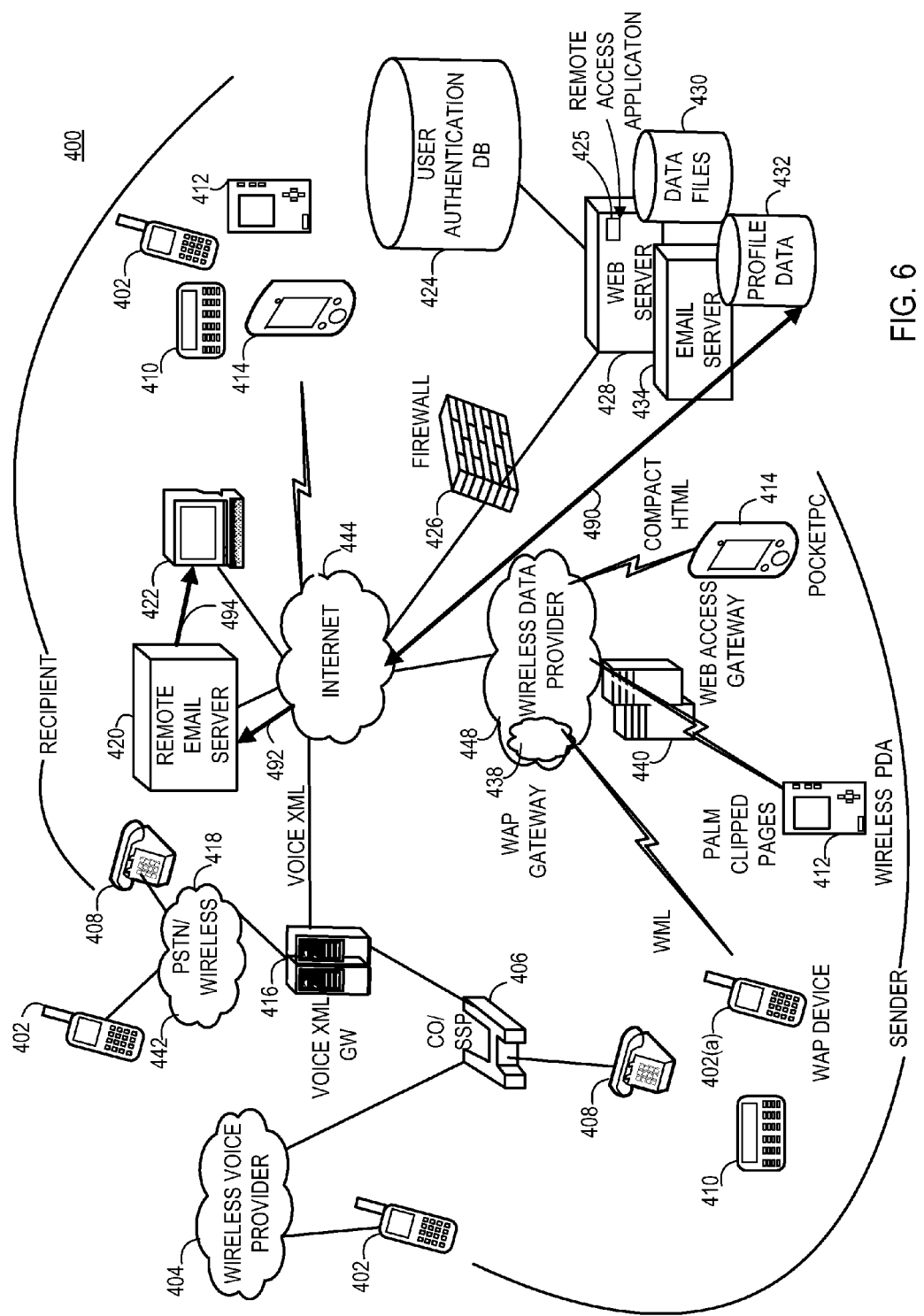
FIG. 6 is a block diagram showing the interaction between exemplary components of a remote data retrieval system when sending data across a cooperating communications network.

FIG. 6 shows the data flow (as indicated by the arrows) of data communicated through remote data access system 400 when performing data delivery to intended delivery targets. For example, a participating user may desire to e-mail a file stored at data files data store 430 to a co-worker. The user formats the request using his/her computing device (e.g. mobile computing device), which may be, for example, a PDA having software thereon to provide an interface such as is described below in connection to FIG. 10. After the request is formatted, it is forwarded via remote data access system 400 to remote access application 425. Remote access application 425 cooperates with data files data store 430 to retrieve the desired data for delivery as indicated by arrow 470. Furthermore, remote access application cooperates with e-mail server 434, as indicated by arrow, 488 which in turn cooperates with profile data store 432, as indicated by arrow 486, to obtain delivery information, such as e-mail address information. In operation, e-mail server 434 communicates the desired data and data directory structure to identified intended targets using the Internet 444 as indicated by arrow 490. In an illustrative implementation, the data may be delivered to a remote e-mail server as indicated by arrow 492. In turn, remote e-mail server 494 may be accessed by a number of communication devices (e.g. mobile telephone 402, pager 410, wireless PDA 412, pocket-PC 414, and client computer 422), as indicated by arrow 494, so that delivery of the desired data to intended targets is realized. After an action, such as sending a file or changing a directory structure, has been taken with respect to the participating user's data, the participating user receives notification that the action has been completed. Thus, after remote access application 425 implements the action specified by the user, it forwards notification to the user.

Figure 7:
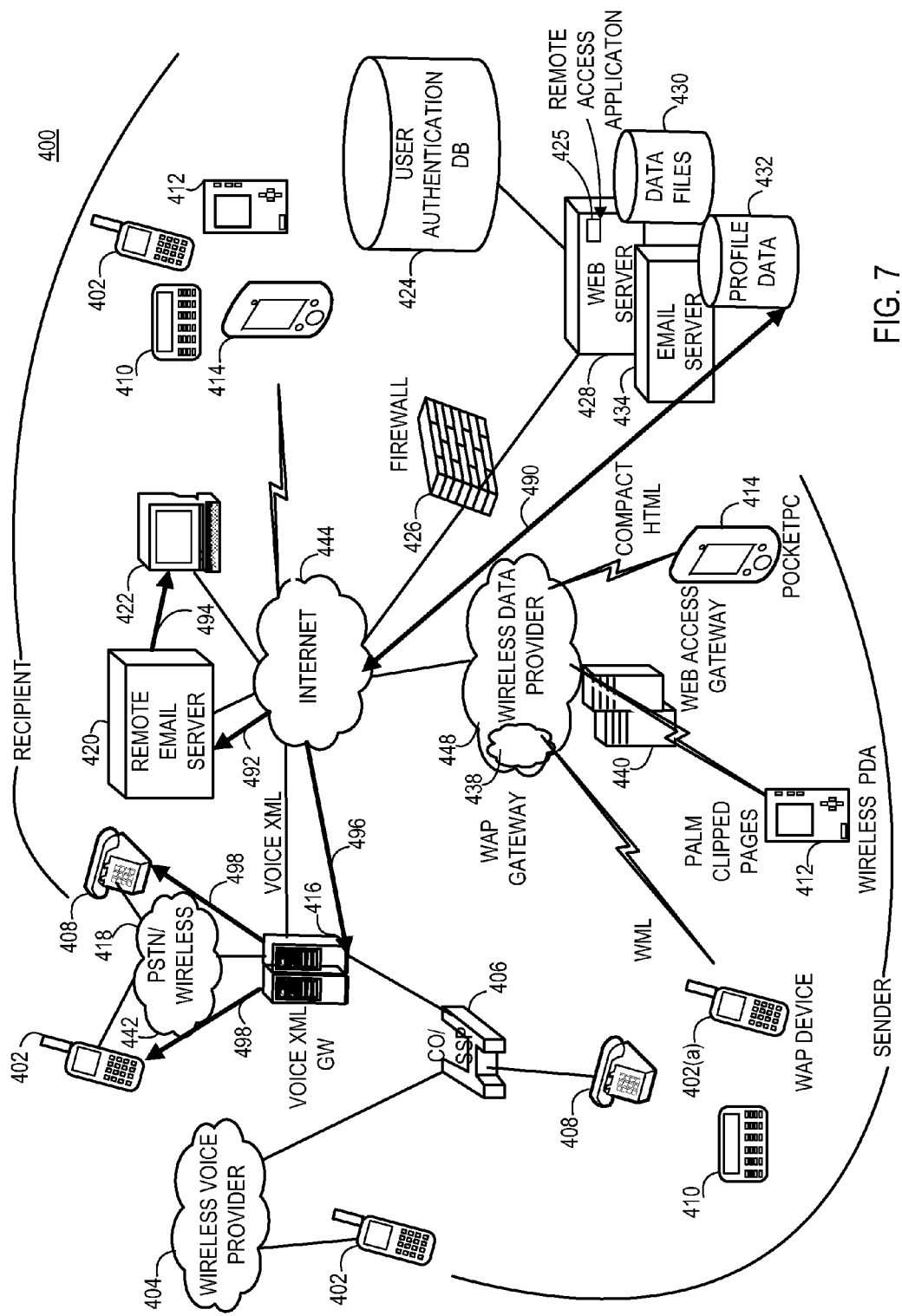
FIG. 7 is a block diagram showing the interaction between exemplary components of a remote data retrieval system when receiving notification of data transmission.

FIG. 7 shows the data flow (as indicated by the arrows) of data communicated through remote data access system 400 when performing data delivery notification. The notification data flow is indicated by arrows 496 and 498. For example, a notification message may be delivered to the requesting communications device(s) to verify that the desired data has been delivered by the remote access system 400 to the intended target(s).

Figure 8:
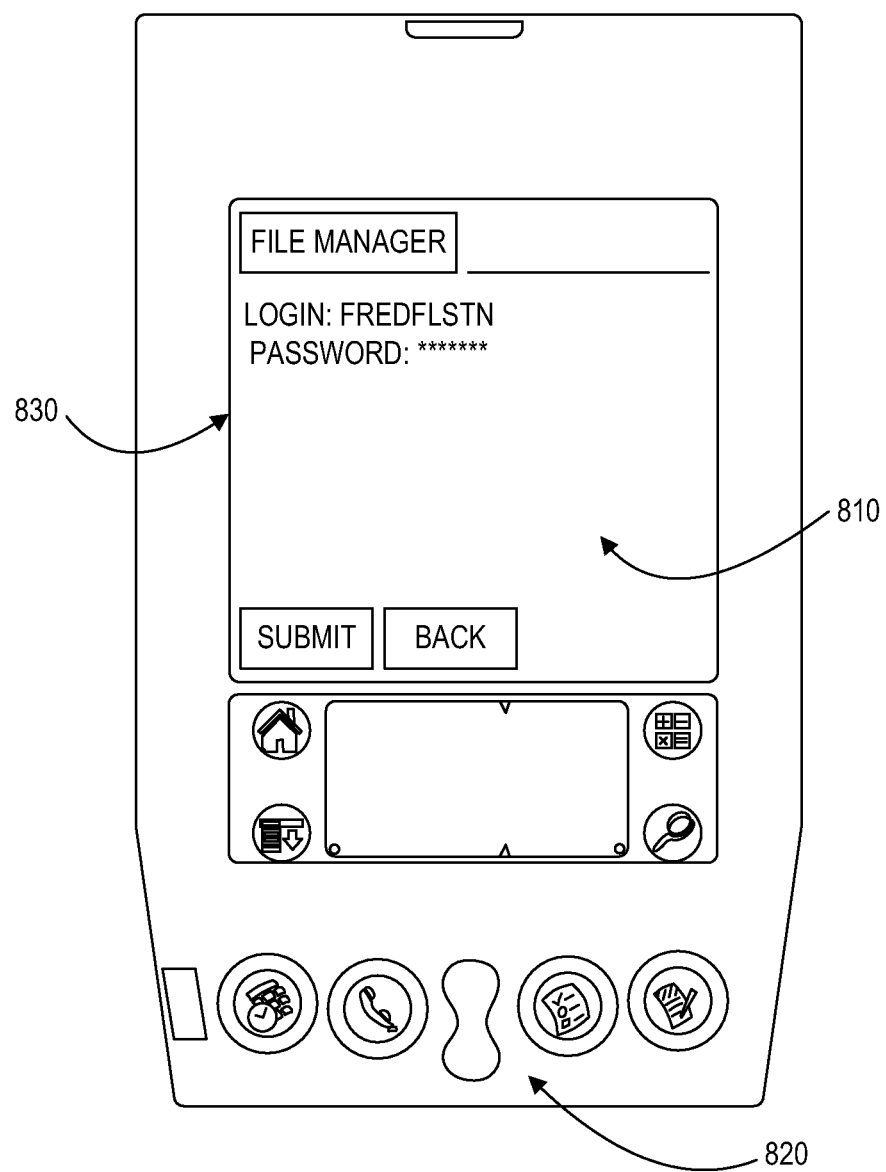
FIG. 8 is a screen shot of an exemplary user interface that allows participating users to log onto a remote data retrieval system.

FIG. 8 shows an exemplary screen shot of a user interface used to authenticate participating users for remote data access by a remote access application. As shown, personal digital assistant (PDA) 17 comprises a display area 810 and navigation controls 820. In operation, a participating user may manipulate data in display area using navigation controls 820. Further, as shown, within, display are 810, user authentication interface 830 may be used to authenticate participating users. For example, user authentication interface 830 may comprise one or more pull down menus that may be operated to input participating user information for communication to a remote access application 425 that is capable of authenticating the user based on the inputted information. Further, user authentication interface 820 may contain one or more dialog boxes that can accept inputs from participating users to indicate the participating user's assigned authentication information (e.g. username and password).

Figure 9A:
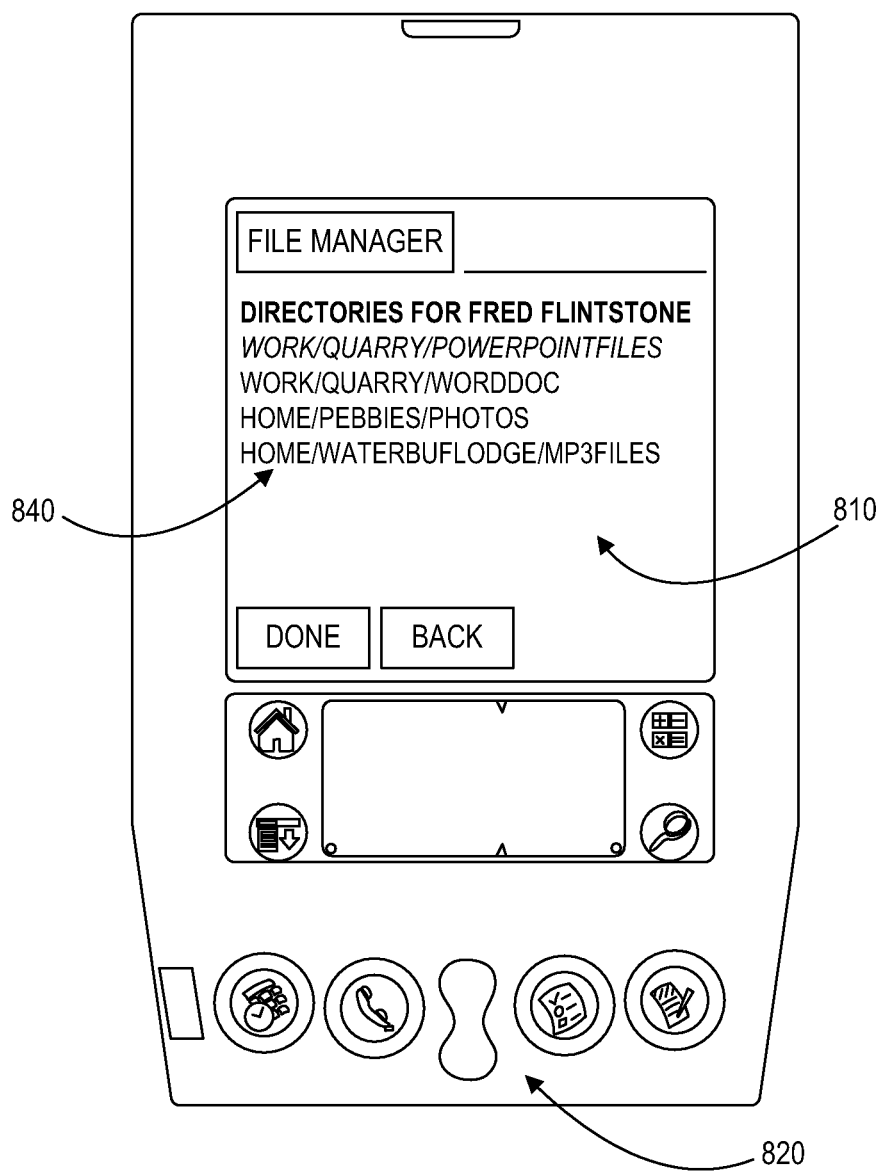
FIGS. 9A-9B are screen shots of exemplary user interfaces when viewing data (directories and/or files) on a remote data retrieval system.
Figure 9B:
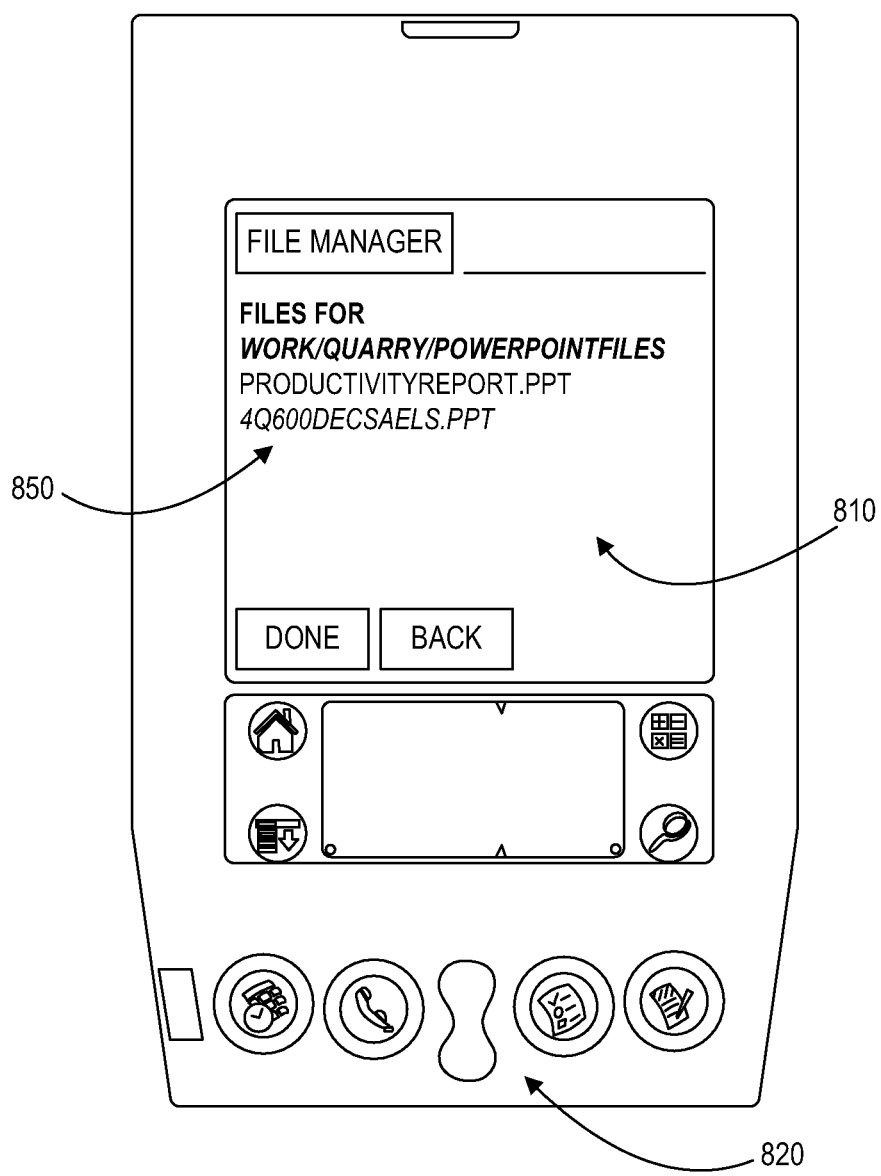

FIGS. 9A and 9B show exemplary screen shots of user interfaces to perform data and data directory structure viewing, manipulation, and storage. In operation, a participating user may manipulate data in display area 810 using navigation controls 820. Within display are 810, data and data directory structure display and manipulation interfaces 840 and 850 may be utilized to realize data and data structure display and manipulation. For example, data and data directory structure display and manipulation interfaces 840 and 850 may comprise one or more pull down menus that may be operated to retrieve desired data from data directory structures. Further, data and data directory structure display and manipulation interfaces 840 and 850 may contain one or more dialog boxes that can accept inputs from participating users to indicate desired data and corresponding data directory structures for retrieval from a remote computer network.

Figure 10:
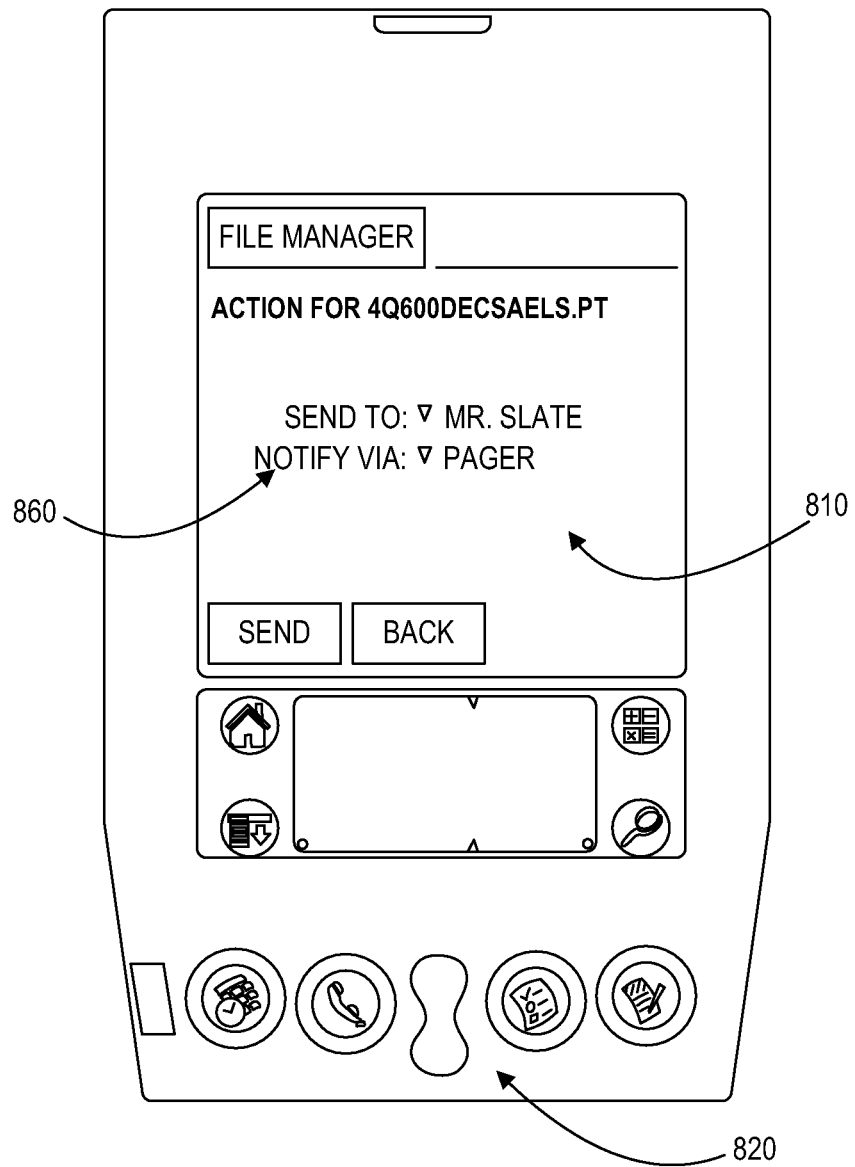
FIG. 10 is a screen shot of an exemplary user interface when sending data via a remote data retrieval and transmission system.

FIG. 10 shows a screen shot of a user interface to perform data delivery and identification of desired data by an exemplary remote access application. As shown personal digital assistant (PDA) 17 comprises a display area 810 and navigation controls 820. In operation, a participating user may manipulate data in display area 810 using navigation controls 820. Further, as shown, within display area 810, data delivery and notification interfaces 860 may be displayed and interacted with to realize data delivery and notification. For example, data delivery and notification interfaces 860 may comprise one or more pull down menus that have information representative of intended targets and provide information about the data that is to be distributed. Further, data delivery and notification interfaces 860 may contain one or more dialog boxes that can accept information representative of data delivery and notification targets. An example of such dialog box is an intended delivery dialog box requesting information about the intended delivery mode (e.g. e-mail, pager, mobile telephone, instant message address, etc) for recipient that is to receive the intended data (that may be described in another dialog box). Indeed, a voice activated interface may be used to provide access to remote data.

It is understood that although a personal digital assistant 17 is described to maintain the exemplary user interfaces as shown in FIGS. 8-10, that such description is merely exemplary as the embodiments of the present invention contemplates the deployment of the same or similar user interfaces in various computing devices including but not limited to, pagers, mobile telephones, mobile computing devices, and any and all other computing device capable of supporting these described user interfaces.

Figure 11:
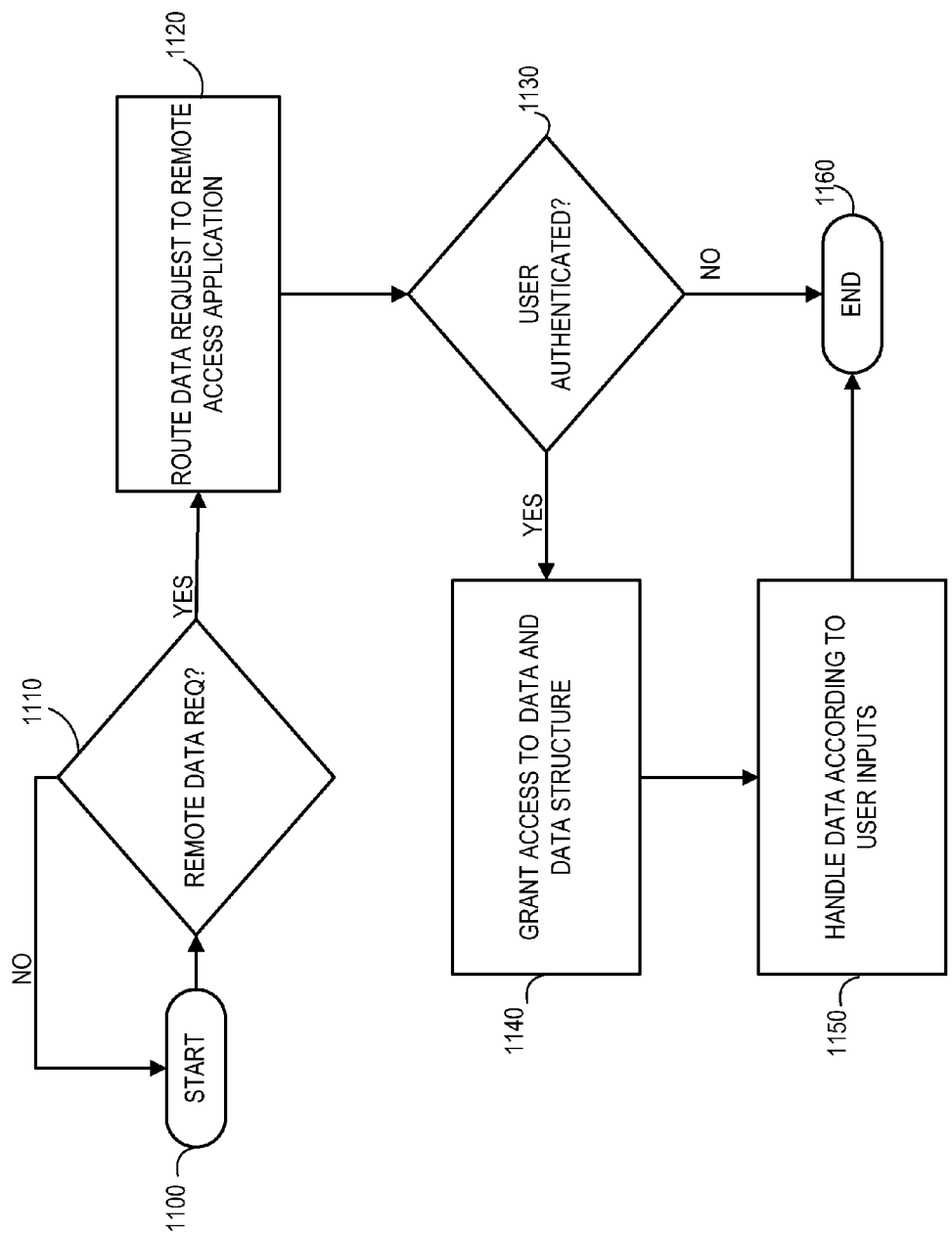
FIG. 11 is a flow diagram of the processing performed when authenticating users and viewing data using a remote data retrieval and transmission system.

FIG. 11 shows the processing performed to authenticate participating users to grant remote access to desired data and data directory structure. As shown, processing begins at block 1100 and proceeds to block 1110 where a check is performed to determine if a request for remote data has been made. If there is no request, processing reverts to block 100 and proceeds from there. However, if a request for remote data has been made at block 110, processing proceeds to block 1120 where the data request is routed to the remote access application 425. Remote access application 425 queries user authentication data store 424 to verify that the user ID and password submitted with the request is valid. From there, processing proceeds to block 1130 where an additional check is performed to determine if the participating user who offers the request for data is authenticated. If the participating user is not authenticated processing terminates at block 1160.

Alternatively, if the user is authenticated at block 1130, processing proceeds to block 1140 where the participating user is granted access to desired data and its corresponding data structure. More specifically, remote access application 425 queries data files data store 430 to determine which data directories and files are accessible by the authenticated user. Processing proceeds to block 1150 where the data is handled in response to participating users' input. From there processing terminates at block 1160.

Figure 12:
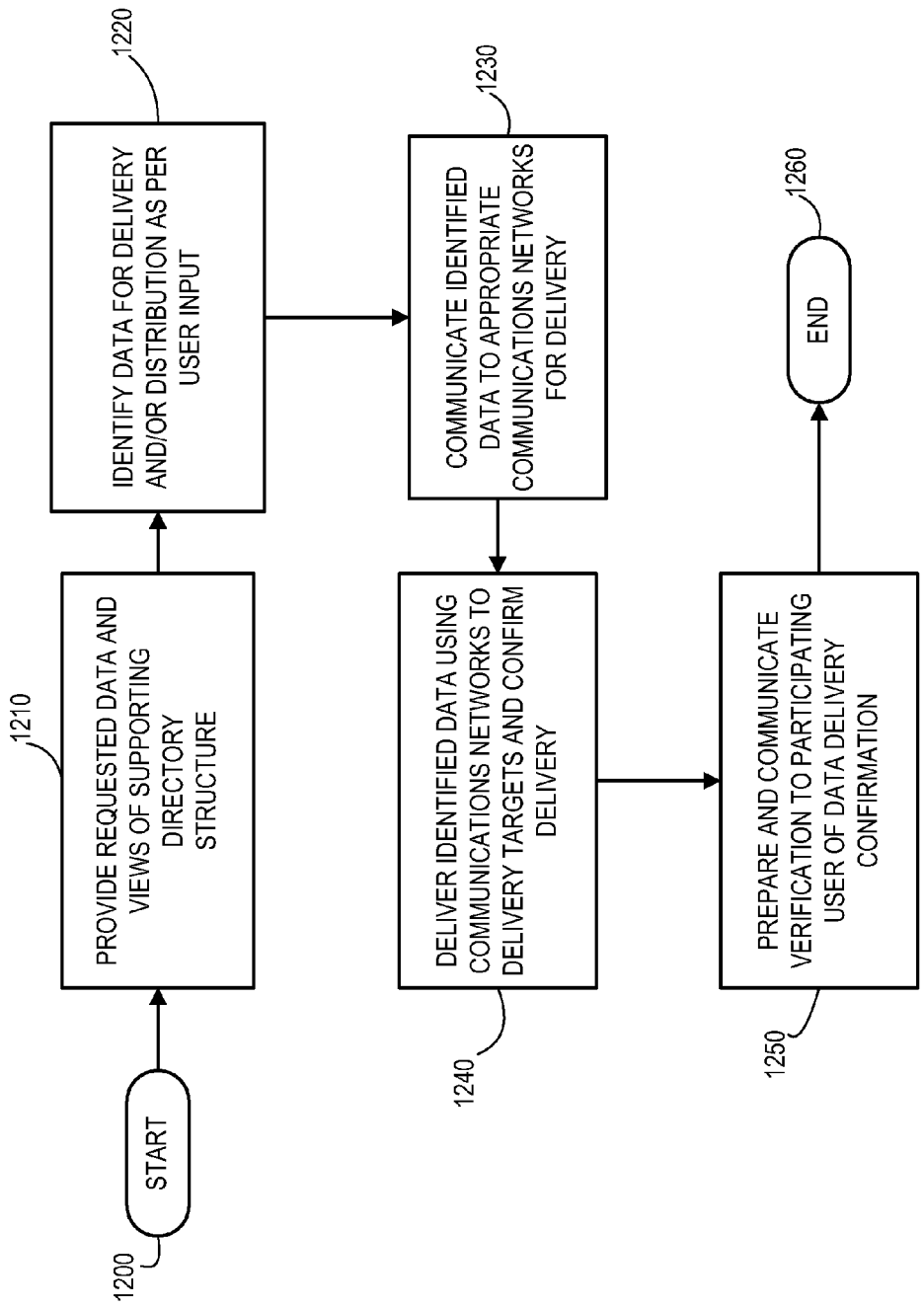
FIG. 12 is a flow diagram of the processing performed when sending data across the remote data retrieval and transmission system

FIG. 12 shows the processing performed when providing notification of delivery of data to desired targets. As shown, processing begins at block 1200 and proceeds to block 1210 where the desired data and its corresponding data directory structure are offered to requesting participating users. In operation, this step may be realized by the interaction of the exemplary remote access application with one or more cooperating data stores that contains the desired data and its corresponding data directory structure(s). From there, the data to be delivered is identified at block 1220. The data is then communicated to the appropriate cooperating communications networks for delivery at block 1230. The data is then delivered and confirmed using the appropriate cooperating communications networks at block 1240. A verification of delivery confirmation is then prepared and communicated to the participating user at block 1250. Processing then terminates at block 1260.

Conclusion

Thus, system and methods have been disclosed herein for remotely retrieving and transmitting data across a communications network such that data management control and data delivery verification are leveraged to participating users. It is understood, however, that the exemplary systems and methods are susceptible to various modifications and alternative constructions. There is no intention to limit the possible embodiments to the specific constructions described herein. On the contrary, the systems and methods may have numerous modifications, alternative constructions, and equivalents.

It should also be noted that the above described systems and methods may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the A) procedures described above. The system may also be considered to be implemented as a computer-readable storage medium, configured with a computer program, where the storage medium so configured causes a computer to operate in a specific and predefined manner.

Although an exemplary implementation of the herein disclosed systems and methods been described in detail above, those skilled in the art will readily appreciate that many additional modifications are possible in the exemplary embodiments without materially departing from the novel teachings and advantages of these systems and methods. Accordingly, these and all such modifications are intended to be included within the scope the herein described system and methods. The herein disclosed system and methods are better defined by the following exemplary claims.

What is claimed is:

1. A method for providing remote data directory structure management capabilities to a requestor across a communications network comprising:
   receiving a first request over the communications network, wherein the first request is for management of data directory structures recorded on a memory;
   identifying data directory structures accessible by querying a profile data store, wherein a single data directory structure is selected from among a plurality of data directory structures associated with the profile data store;
   providing data directory structure information related to the single data directory structure by the computing device;
   receiving a second request, the second request indicating a data file within the single data directory structure and an electronic address associated with a user other than the requestor;

sending the data file to the electronic address via a designated data file delivery mode without sending the data file to the requestor;

generating a notification of delivery of the data file to the electronic address upon delivery of the data file;

sending the notification of delivery via a designated notification delivery mode;

receiving a third request indicating a modification to the single data directory structure; and modifying the single data directory structure in accordance with the third request.

2. The method of claim 1, wherein the first request comprises a user identification and password.

3. The method of claim 2, further comprising:
authenticating the user identification and password information by querying a data store containing valid user information.

4. The method of claim 1, wherein sending the data file further comprises preparing an electronic message with the data file attached.

5. A non-transitory computer readable medium having computer code stored therein configured to be executed by a electronic hardware device, for providing remote data directory structure management capabilities to a requestor across a communications network, the computer code comprising:

code for receiving a first request over the communications network, wherein the first request is for management of data directory structures recorded on a memory;

code for identifying data directory structures accessible by querying a profile data store, wherein a single data directory structure is selected from among a plurality of data directory structures associated with the profile data store;

code for providing data directory structure information related to the single data directory structure by the computing device;

code for receiving a second request, the second request indicating a data file within the single data directory structure and an electronic address associated with a user other than the requestor;

code for sending the data file to the electronic address via a designated data file delivery mode without sending the data file to the requestor;

code for generating a notification of delivery of the data file to the electronic address upon delivery of the data file;

code for sending the notification of delivery via a designated notification delivery mode;

code for receiving a third request indicating a modification to the single data directory structure; and code for modifying the single data directory structure in accordance with the third request.

6. The a non-transitory computer readable medium of claim 5, wherein the first request comprises a user identification and password.

7. The a non-transitory computer readable medium of claim 6, further comprising:
code for authenticating the user identification and password information by querying a data store containing valid user information.

8. The a non-transitory computer readable medium of claim 5, code for sending the data file further comprises preparing an electronic message with the data file attached.

9. A system comprising software and electronic computer hardware for providing remote data directory structure management capabilities to a requestor across a communications network, the system being configured to:

receive a first request over the communications network, wherein the first request is for management of data directory structures recorded on a memory;

identify data directory structures accessible by querying a profile data store, wherein a single data directory structure is selected from among a plurality of data directory structures associated with the profile data store;

provide data directory structure information related to the single data directory structure by the computing device;

receive a second request, the second request indicating a data file within the single data directory structure and an electronic address associated with a user other than the requestor;

send the data file to the electronic address via a designated data file delivery mode without sending the data file to the requestor;

generate a notification of delivery of the data file to the electronic address upon delivery of the data file;

send the notification of delivery via a designated notification delivery mode; receive a third request indicating a modification to the single data directory structure; and modify the single data directory structure in accordance with the third request.

10. The system of claim 9, wherein the first request comprises a user identification and password.

11. The system of claim 10, the system being further configured to:
code for authenticating authenticate the user identification and password information by querying a data store containing valid user information.

12. The system of claim 9, wherein sending the data file further comprises preparing an electronic message with the data file attached.

* * * * *